United States Patent [19]

Ishii

[11] Patent Number: 5,038,739
[45] Date of Patent: Aug. 13, 1991

[54] CONTROL ARRANGEMENT FOR MULTI-CYLINDER TWO CYCLE ENGINE

[75] Inventor: Mitsunori Ishii, Yokohama, Japan

[73] Assignee: Nissan Motor Company, Ltd., Japan

[21] Appl. No.: 571,854

[22] Filed: Aug. 24, 1990

[30] Foreign Application Priority Data

Sep. 7, 1989 [JP] Japan .................................. 1-232416

[51] Int. Cl.$^5$ .............................................. F02D 41/34
[52] U.S. Cl. .................................. 123/481; 123/198 F
[58] Field of Search ......... 123/73 C, 73 CB, 198 DB, 123/198 F, 294, 481

[56] References Cited

U.S. PATENT DOCUMENTS

| | | |
|---|---|---|
| 4,172,434 | 10/1979 | Coles ................................... 123/481 |
| 4,276,863 | 7/1981 | Sugasawa et al. .................... 123/481 |
| 4,391,255 | 7/1983 | Staerzl ................................. 123/481 |
| 4,469,071 | 9/1984 | Bassi et al. ........................... 123/481 |
| 4,541,387 | 9/1985 | Morikawa ............................ 123/481 |

FOREIGN PATENT DOCUMENTS

| | | |
|---|---|---|
| 0258950 | 11/1986 | Japan ..................................... 123/481 |
| 63-134141 | 9/1988 | Japan . |
| 63-134173 | 9/1988 | Japan . |
| 64-11337 | 1/1989 | Japan . |
| 1-33649 | 7/1989 | Japan . |
| 1-34283 | 7/1989 | Japan . |
| 2122682 | 1/1984 | United Kingdom ................. 123/481 |

*Primary Examiner*—Willis R. Wolfe
*Attorney, Agent, or Firm*—Lowe, Price, LeBlanc & Becker

[57] ABSTRACT

A multi-cylinder 2 cycle engine having n cylinders has fuel injected and ignited at $(n-1) \times 360/n$ crank angle intervals. This induces the situation wherein combustions occur in each cylinder at $n-1$ cycle intervals. This provides at least one piston stroke for each cylinder during in which no combustion takes place and fresh air is pumped through the combustion chamber in a manner to scavenge residual combustion gases therefrom.

4 Claims, 6 Drawing Sheets

1CYCLE  2CYCLE  3CYCLE  4CYCLE  5CYCLE

CONTROL ARRANGEMENT FOR MULTI-CYLINDER TWO CYCLE ENGINE

BACKGROUND OF THE INVENTION

1. Field of the Invention

The present invention relates generally to a two stroke engine and more specifically to a load responsive fuel supply control arrangement for a multi-cylinder two stroke engine.

2. Description of the Prior Art

JU-A-64-11337 discloses a two cycle engine wherein all of the cylinders are used during high load operation and during low speed/low load modes of operation fuel supply to a selected number of cylinders is cut-off.

During the mode of operation wherein a number of cylinders are deactivated, the blow down effect induced by the exhausting of the combustion gases the amount of fresh air which is inducted into the active cylinders is increased as compared with the amount which is inducted into the deactivated cylinders. Due to this increase in fresh air induction, the amount of fuel which is injected also increases. Accordingly, the ignition and combustion characteristics tend to be maintained.

Further, as a number of cylinders are deactivated the amount of torque which is produced by the engine tends to be reduced. As a result, the throttle valve opening degree is increased and the amount of fresh air which inducted into the active cylinders and the amount of residual combustion gas which tends to be retained in said cylinders tends to be reduced. Accordingly, reliable ignition and stable low load engine operation is achieved.

However, with this type of arrangement, at the time the deactivated cylinders are re-activated, the change to full cylinder operation induces a sudden marked increase in engine torque. Further, during the partial cylinder mode, as the active cylinders are each supplied with fuel every two cycles of the engine, combustion gasses tends not to be adequately exhausted from the combustion chambers and results in the deterioration of the combustion process.

SUMMARY OF THE INVENTION

It is an object of the present invention to enable a so called partial cylinder engine operational mode which improves cylinder scavenging and engine stability under low speed-low load modes of operation.

In brief, this object is achieved by an arrangement wherein in a multi-cylinder 2 cycle engine having n cylinders, fuel is injected and ignited at $(n-1)\times 360/n$ crank angle intervals and induces the situation wherein combustions in each cylinder occur each $(n-1)$ cycles. This provides at least one piston stroke for each cylinder during which no combustion takes place and fresh air is pumped through the combustion chamber in a manner to scavenge residual combustion gases therefrom.

More specifically, a first aspect of the present invention comes in the form of a multi-cylinder two cycle internal combustion engine having n cylinders, which features: an engine load sensor; an engine speed sensor; fuel injection control means, the fuel injection control means being responsive to the engine load sensor and the engine speed sensor and arranged to detect the engine operating in a low load-low speed zone, the fuel injection means including circuitry for injecting fuel into any given cylinder at $(n-1)\times 360/n$ crank angle intervals and so that combustions in the any given cylinder occur at $n-1$ cycles, during the low speed-low load mode of operation.

A second aspect of the present invention comes in a method of operating a two cycle internal combustion engine having n cylinders, which features the steps of: sensing engine load; sending engine speed; detecting the engine operating in a predetermined engine speed-load zone; controlling the fuel injection so that fuel is injected into a cylinder at $(n-1)\times 360/n$ crank angle intervals and so that combustions in the any given cylinder occur at $n-1$ cycles, when the engine is detected as operating in the predetermined engine speed-load zone.

DETAILED DESCRIPTION OF THE PREFERRED EMBODIMENTS

Figure 1:
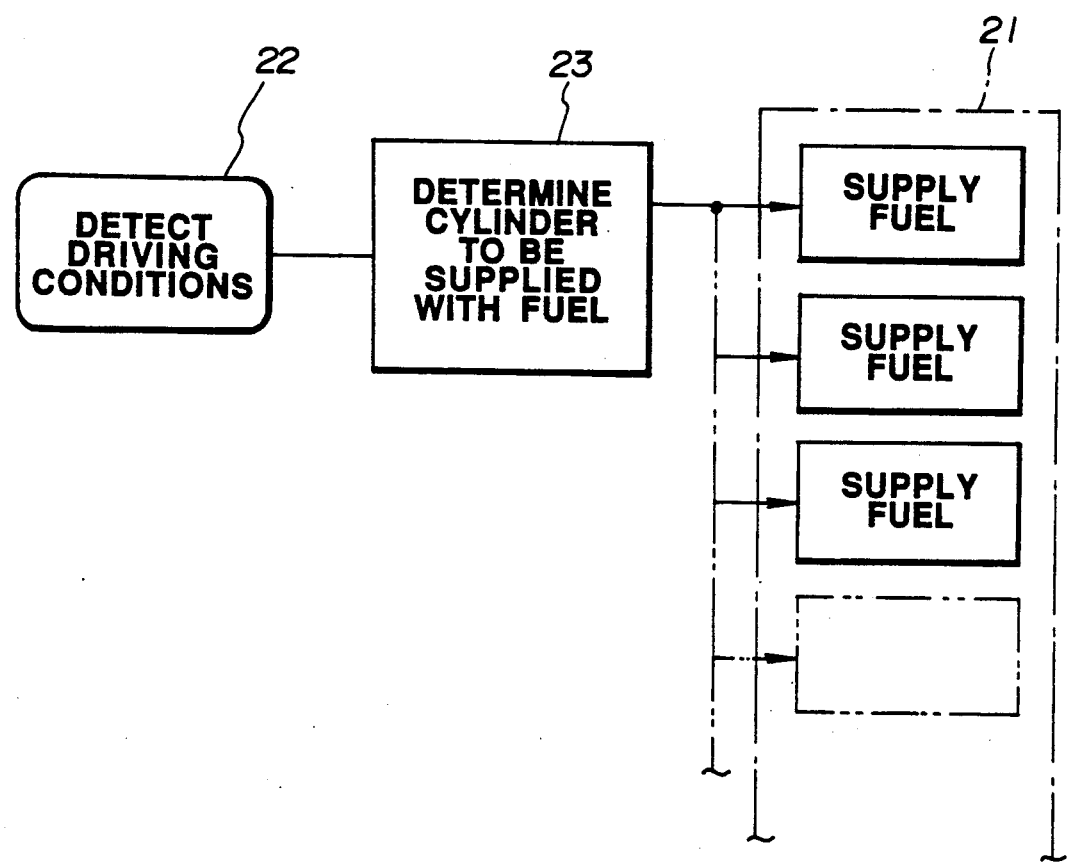
FIG. 1 is a block diagram which depicts the conceptual arrangement of the present invention.
Figure 2:
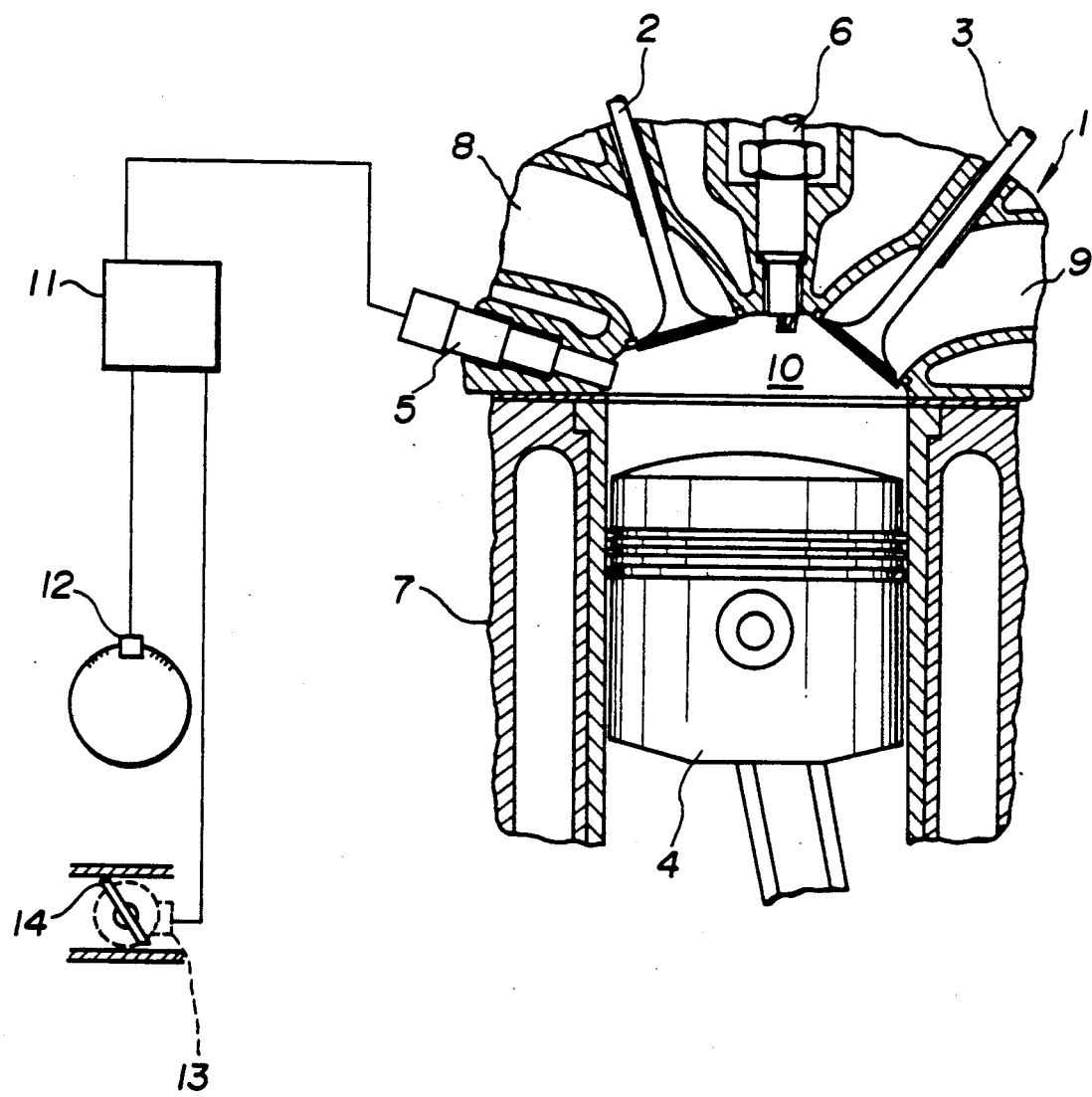
FIG. 2 is a sectional view showing a two cylinder engine of the nature to which the embodiments of the invention are applied.

FIG. 2 shows a two cycle engine of the type to which the present invention is applicable. In this arrangement, the two cycle engine 1 includes an inlet valve 2, an exhaust valve 3, a piston 4 which is reciprocatively received in a cylinder 7, a fuel injection valve 5, and a spark plug 6 which is arranged to ignite the air-fuel charge in the cylinder at a timing close to TDC.

Following ignition after the piston 4 has descended by a predetermined amount, the inlet and exhaust valves 2, 3 are opened and supercharged air from a non-illustrated supercharger is supplied into the combustion chamber 10 via intake port 8, while the combustion gases are exhausted via an exhaust port 9.

A control circuit 11 which includes a microprocessor, control the timing and period for which fuel is injected into the combustion chamber 10. The control circuit 11 is connected with a crank angle sensor 12. As is conventional, the output of the crank angle sensor is used to determine the above mentioned injection timing and duration.

A throttle valve 13 position sensor is operatively connected with a throttle valve 14 in order to ascertain the opening degree thereof and to issue a signal indicative of the load on the engine.

Figure 3:
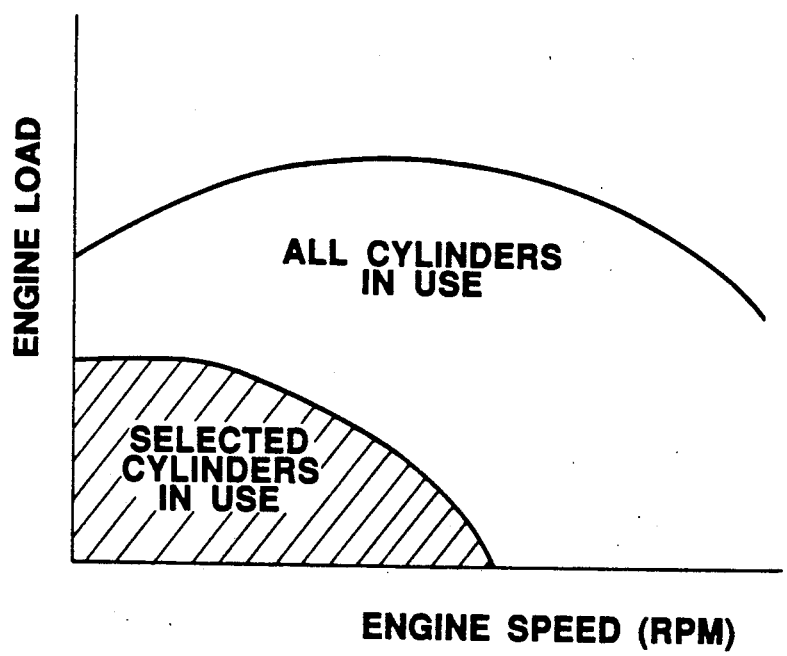
FIG. 3 is a graph which shows in terms of engine load and engine speed, the partial cylinder operation zone in which control according to the present invention is implemented.

The control circuit 11 is arranged to determine that the engine is operating under low speed/low load conditions when the engine speed/load coordinate falls in the hatched zone shown in FIG. 3. In the event that the engine is detected operating in such a zone, the control circuit switches from a mode wherein all of the cylinders are supplied with fuel to one wherein a predetermined number only are supplied.

In accordance with the present invention, injection of fuel is controlled so that only cylinders which are sparked at $(n-1)\times 360/n$ intervals are supplied with fuel.

In the case of a four cylinder engine this results in the fuel being injected into a cylinder and subsequently ignited at 270° intervals.

Figure 4:
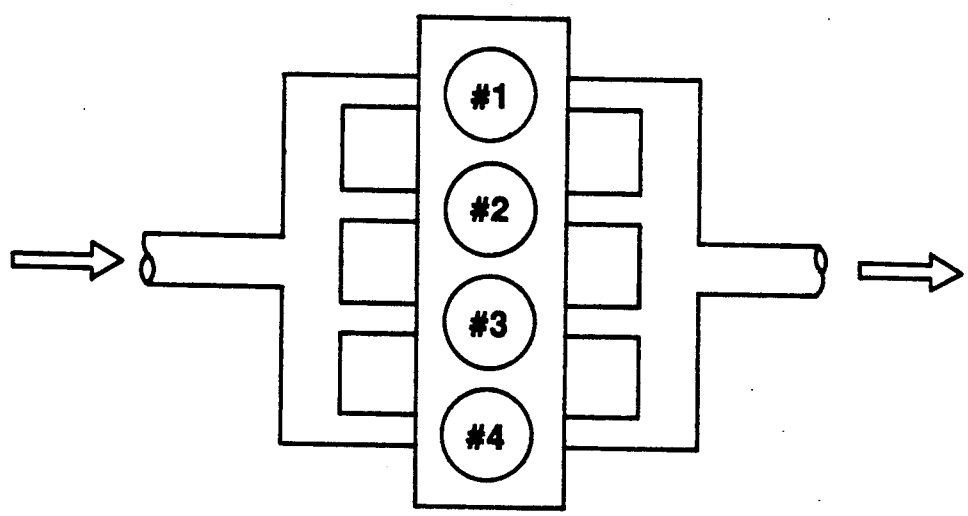
FIGS. 4 and 5 show a four cylinder two cycle engine and the manner in which fuel is injected under low load modes of operation in accordance with the present invention.

That is to say, in a four cylinder engine of the nature schematically illustrated in FIG. 4, when the engine is operating under a mode wherein all cylinders are employed, fuel is injected and ignitied at 90° intervals as indicated by the black dots. However, when the operation shifts into a "partial" cylinder mode as it will be referred to hereinafter, fuel is only injected at 270° intervals as indicated by the circled dots. Viz., injection to any given cylinder is carried out at $n-1$ cycle intervals.

Figure 5:
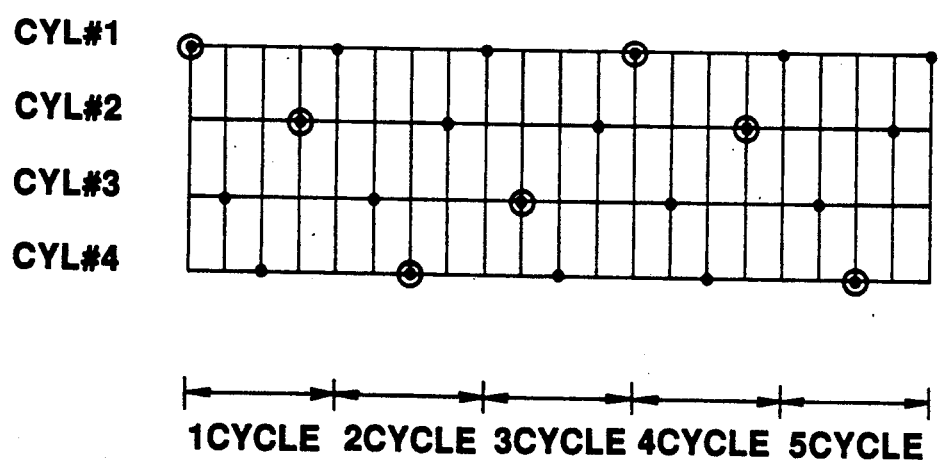

As will be appreciated, from FIG. 5 first cylinder 1 is supplied with fuel (and ignited) and cylinders 3 and 4 are deactivated, following this cylinder 2 is injected. Next, cylinders 1 and 3 are left inactive and cylinder 4 is injected. After this, cylinders 2 and 1 are deactivated and cylinder 3 is injected. Following this, cylinders 4 and 2 are rested and cylinder 1 is injected and ignited.

In accordance with this sequence all of the cylinders are subject to injection and ignition every three cycles. Accordingly, following an injection and ignition in any one cylinder, two cycles elapse before the next injection takes place. During these two cycles the piston 4 rises to TDC and the inlet and exhaust valves 2, 3 are opened and closed in the normal manner. As a result, as no combustions take place, any residual combustion gas is almost completely scavenged from the combustion chambers 10 via the flow of fresh air which occurs during the two "inactive" cycles. This essentially eliminates improper combustion and stabilizes engine operation during low load low speed modes of engine operation with the effect that fuel consumption of the engine is reduced.

Further, as combustions occur at 270° intervals, the torque generation of the engine tends to be unified and the smoothness of the crank shaft increased.

In essence the above control is such as to induce a 4 cylinder 2 cycle engine to behave as a 3 cylinder four cycle engine.

Figure 6:
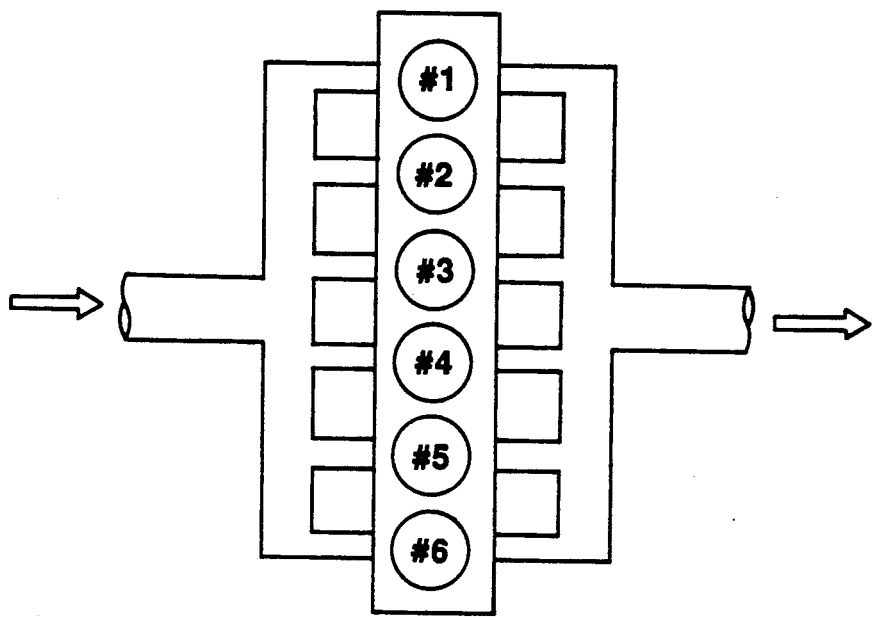
FIGS. 6 and 7 and 8 and 9 are similar view which show the application of the present invention to 6 and 3 cylinder engines respectively.
Figure 7:
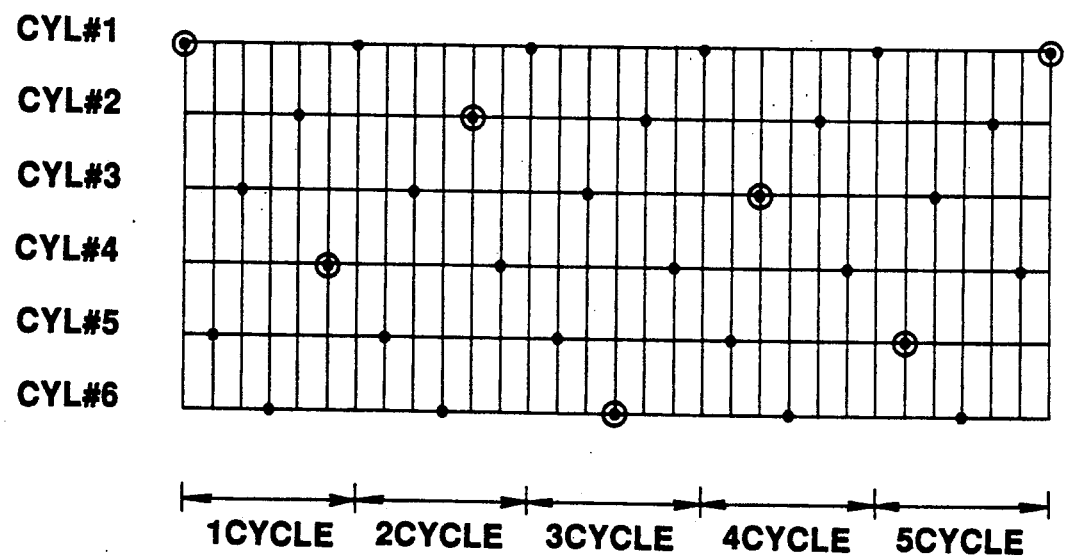

FIGS. 6 and 7 show a second embodiment of the present invention wherein the inventive concept is applied to a six cylinder engine. In this case when all of the cylinders are in use, the cylinders #1, #2, #3, #4, #5 and #6 are injected and fired at 60° intervals as indicated by the black dots shown in FIG. 7. On the other hand, when the partial cylinder mode is employed injections are made at 300° crank angle intervals. As will be appreciated, this provides a five cycle interval between combustions in any given cylinder.

Figure 8:
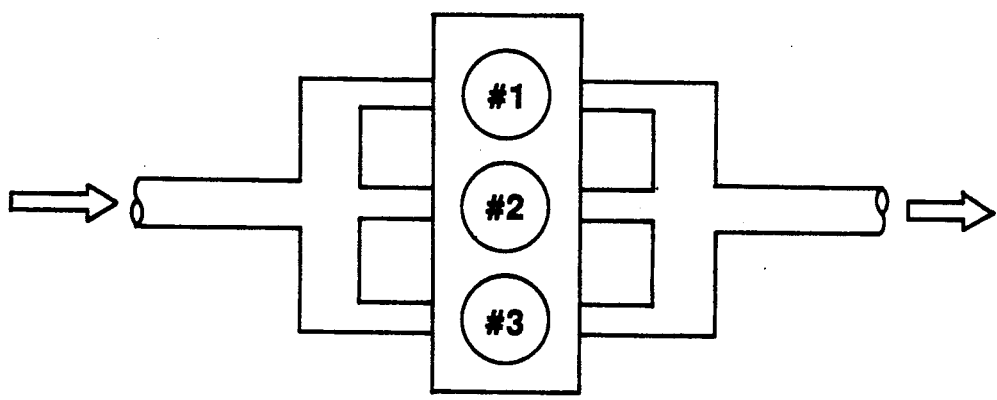
Figure 9:
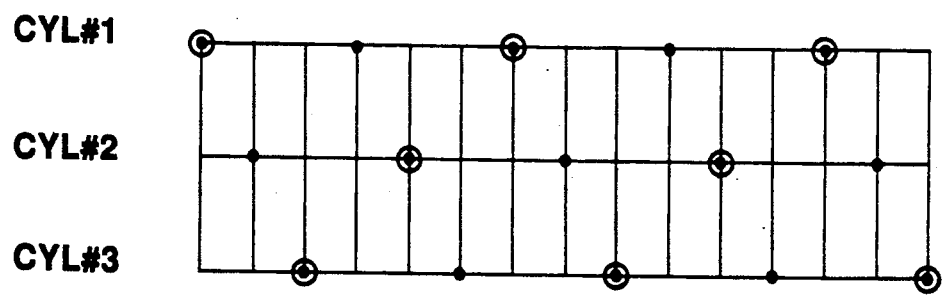

FIG. 8 and 9 show a third embodiment of the present invention. In this case the inventive concept is applied to a three cylinder engine. In this instance under the full cylinder mode of operation, injections are made at 120° intervals. Under the partial cylinder mode of operation injections are indicated by the circled dots and occur at 240° intervals. Thus, in this embodiment each cylinder is injected and fired once every two cycles.

It should be noted that the present invention is not limited to spark injected engines and can be applied to Diesel type engine as well.

What is claimed is:

1. In a multi-cylinder two cycle internal combustion engine having n cylinders
   an engine load sensor;
   an engine speed sensor;
   fuel injection control means, said fuel injection control means being responsive to said engine load sensor and said engine speed sensor and arranged to detect the engine operating in a low load-low speed zone, said fuel injection means including circuitry for injecting fuel into any given cylinder at $(n-1)\times 360/n$ crank angle intervals and so that combustions in said any given cylinder occur at $n-1$ cycles, during said low speed low load mode of operation.

2. A multi-cylinder two cycle internal combustion engine as claimed in claim 1 wherein said engine has a poppet type inlet valve and a poppet type exhaust valve.

3. A multi-cylinder two cycle internal combustion engine as claimed in claim 1 wherein said fuel injection control means controls a fuel injector which injects fuel directly into a combustion chamber of the engine.

4. In a method of operating a two cycle internal combustion engine having n cylinders, the steps of:
   sensing engine load;
   sending engine speed;
   detecting the engine operating in a predetermined engine speed-load zone;
   controlling the fuel injection so that fuel is injected into a cylinder at $(n-1)\times 360/n$ crank angle intervals and so that combustions in said any given cylinder occur at $n-1$ cycles, when said engine is detected as operating in said predetermined engine speed-load zone.

* * * * *